July 29, 1952 C. E. COX 2,604,784
FLOWMETER
Filed June 13, 1946 3 Sheets-Sheet 2
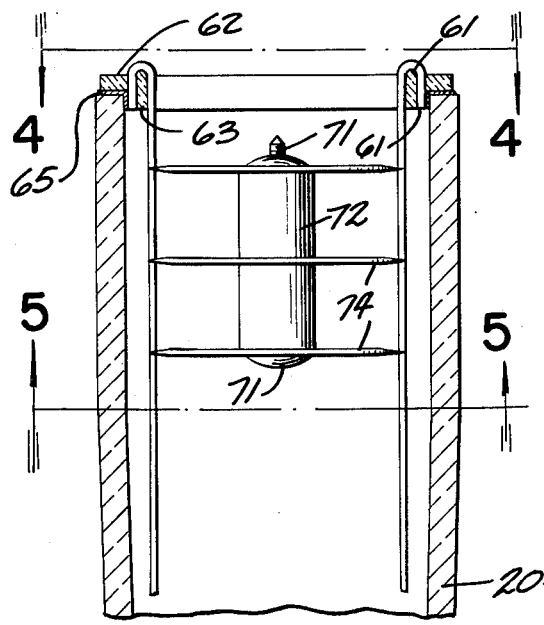
FIG. 3.
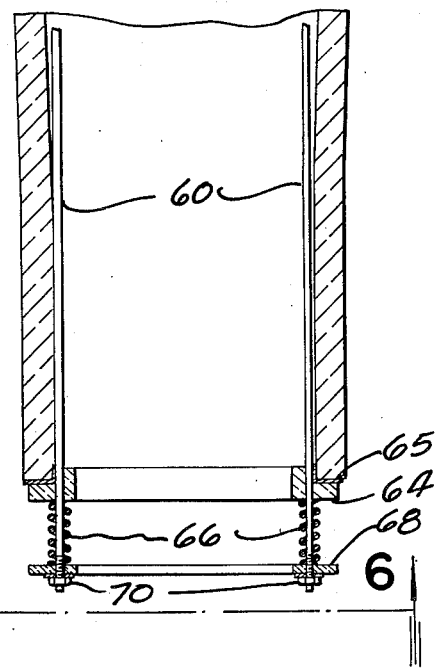
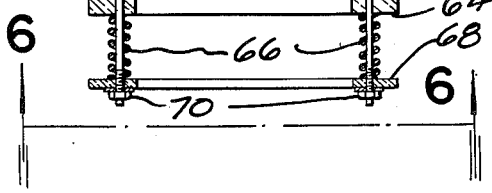
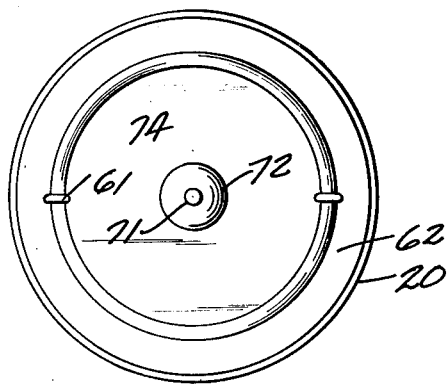
FIG. 4.
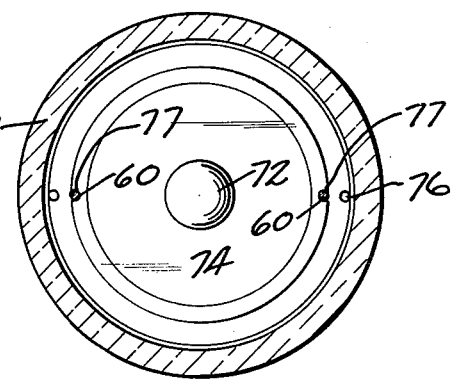
FIG. 5.
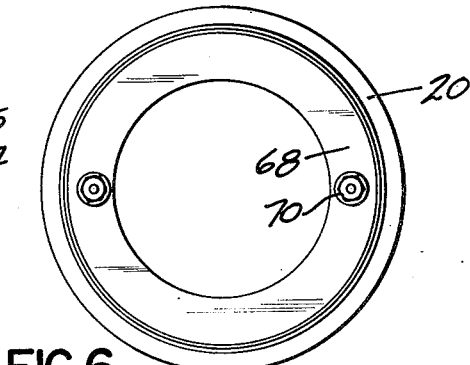
FIG. 6.
INVENTOR
CLAUDE E. COX
BY
Parker and Burton
ATTORNEYS.

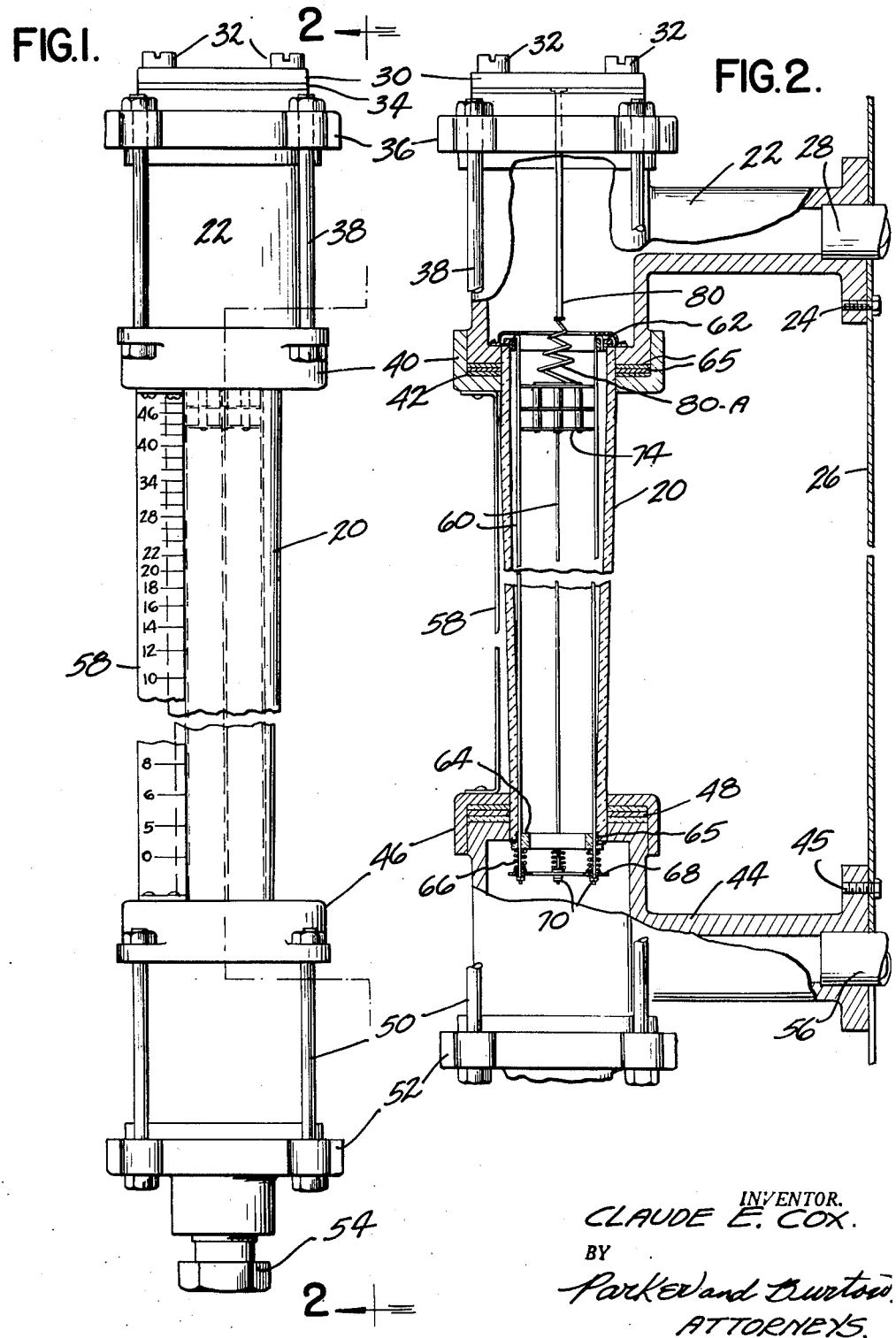

July 29, 1952 C. E. COX 2,604,784
FLOWMETER
Filed June 13, 1946 3 Sheets-Sheet 3
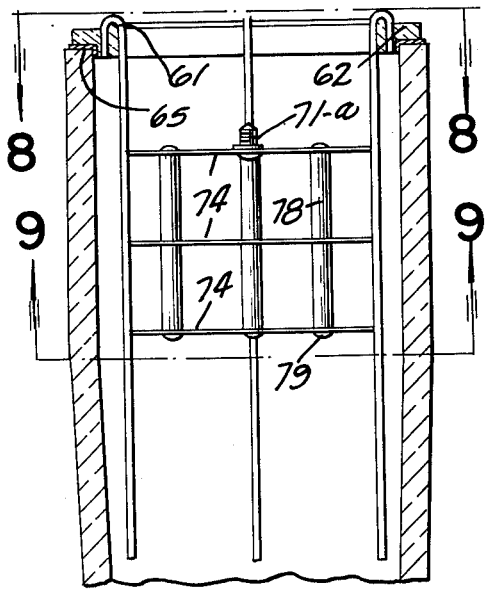
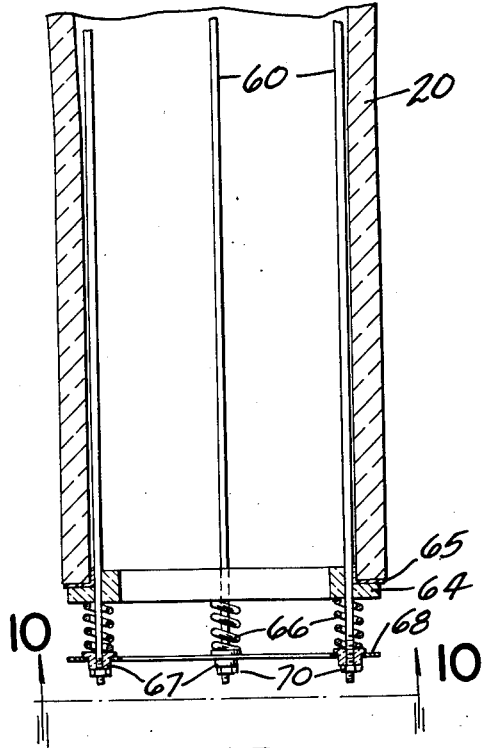
FIG. 7.
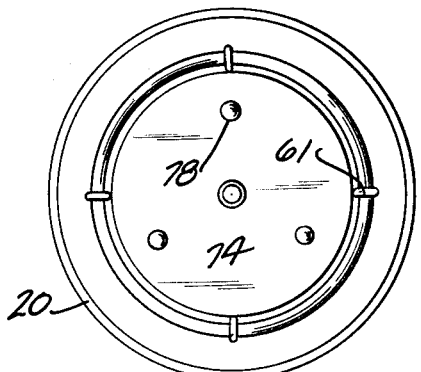
FIG. 8.
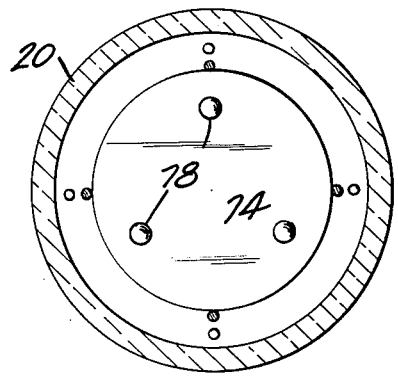
FIG. 9.
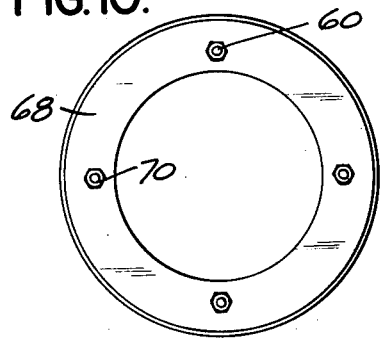
FIG. 10.
INVENTOR.
CLAUDE E. COX.
BY
Parker and Burton
ATTORNEYS.

Patented July 29, 1952

2,604,784

UNITED STATES PATENT OFFICE 2,604,784

FLOWMETER

Claude E. Cox, Detroit, Mich.

Application June 13, 1946, Serial No. 676,419

8 Claims. (Cl. 73—209)

This invention relates to improvements in flow meters of the type wherein there is provided a flow meter tube having an upright tapered bore portion of vertically varying cross sectional area in which a float adapted to restrict and to be positioned by the flow of fluid through the tube is supported for axial movement within the bore in response to the flow of fluid through the bore.

An object is to provide a flow meter of this type wherein the float is constrained by guides to follow an axial path and wherein the frictional resistance imposed upon the movement of the float by the guides is reduced to a minimum.

A further object is the provision of a flow meter of the character described wherein the float is constrained by guides to follow an axial path through the bore of the tube which guides are longitudinal and may be individually tensioned.

Another object of the invention is that the guides are capable of being readily assembled within or withdrawn from the flow meter tube for cleaning or replacement or the like.

A meritorious feature resides in the provision of guides which are carried by guide supports disposed at opposite ends of the tube and adapted to accurately position the guides in proper spaced relationship within the bore of the tube parallel to its axis.

An advantage of this construction is that the guides take up a minimum amount of space within the tube and yet suffice to hold the float accurately against tilting within the tube.

Another advantage of the instant structure is that the float guides are carried by guide supports which supports are mounted upon opposite ends of the flow meter tube and so constructed and disposed that the flow meter float may be readily received into position within the bore of the tube or withdrawn therefrom through one of the guide supports at one end of the tube.

These guides may consist of guide wires held under tension between guide supports mounted upon opposite ends of the tube. These guide wires extend through the bore of the tube parallel to its axis. They are accurately positioned by the supports within the bore of the tube and are held thereby spaced apart circumferentially about the bore and held spaced from the wall of the bore. A flow meter float is mounted between the guides for up and down movement slidably over the guides axially of the bore. This float may be free to rotate about the axis of the bore between the guides or it may be held by the guides against rotation. Both forms are shown.

Other objects, advantages and meritorious features of this invention will more fully appear from the following description, appended claims and accompanying drawings, wherein:

Figure 1 is a front elevation of a flow meter embodying my invention.

Figure 2 is a longitudinal cross sectional view taken on the line 2—2 of Figure 1.

Figure 3 is a vertical sectional view through the transparent flow meter tube.

Figure 4 is a plan taken on the line 4—4 of Figure 3.

Figure 5 is a section taken on the line 5—5 of Figure 3.

Figure 6 is a plan view looking upwardly from the line 6—6 of Figure 3.

Figure 7 is a vertical sectional view similar to that of Figure 3 but showing a modified form of construction.

Figure 8 is a view taken on the line 8—8 of Figure 7.

Figure 9 is a view taken on the line 9—9 of Figure 7.

Figure 10 is a view taken on the line 10—10 of Figure 7.

The flow meter glass tube 20 is supported as shown in Figures 1 and 2 between upper and lower end fittings. The upper end fitting 22 is a T-shaped section secured by screw studs 24 or the like to a support or back plate 26 as shown in Figure 2. A liquid outlet pipe 28 is shown as leading away from the end fitting. This T-member is closed at the top by a cap 30 held to the body of the T-section by screw studs 32. A gasket 34 is shown interposed between the cap and T-section. The upper end of the T-section is provided with a radially projecting boss 36 through which extend a series of bolts 38. These bolts hold a cup shaped cap 40 upwardly against a plurality of packing gaskets 42 about the glass tube 20 and against the lower end of the T-section as shown particularly in Figure 2 so as to provide a tight joint between the end fitting and the upper end of the glass tube.

The lower fitting is similarly constructed and arranged. There is a T-section 44 secured by screws 45 to the back plate 26. This fitting includes a cup shaped cap 46 which holds a series of packing gaskets 48 about the glass tube and down against the end of the fitting. This cap 48 is held in place by bolts 50 which extend through a boss 52 formed on the lower end of the fitting. This fitting is provided with a removable plug 54 whereby it may be drained. An inlet pipe 56 is shown as received within the tubular neck of the T-section 44. Liquid flows through the lower fitting and upwardly through the glass tube and outwardly through the upper fitting. A graduated scale 58 is shown as extending linearly of the tube and may be calibrated in any desired scale of measurement.

The construction hereinabove generally described is not that to which this invention pertains. This invention pertains to the glass tube assembly which will now be described.

Flow meters have heretofore been provided wherein a single guide wire extended axially through the tapered bore of the tube and a float was mounted upon the wire for slidable movement thereover. Such wire had to be accurately axially centered within the bore of the tube and in case that cleaning of the wire or float became necessary the wire had to be removed and when replaced had to be again accurately centered. Furthermore swirling of the liquid within the tube tended to produce an off-center force acting upon the float which, because of the leverage of such action, tended to cause the float to bind upon a single guide wire.

The instant structure embodies a plurality of guide wires mounted within the bore of the flow meter tube. The float is guided in its rise and fall through the tube between these guide wires. The guide wire assembly is capable of being accurately and quickly positioned within the tube.

The tube 20 is formed of glass or other suitable transparent material. It is shown as embodying an upright internally tapered body portion terminating at top and bottom in relatively short length cylindrical portions which are directly received within the fittings above described. The bore of this tube constitutes a liquid passageway. That portion of the bore which is tapered constitutes a passageway of vertically varying cross sectional area. The tube is provided interiorly with guides adapted to constrain an indicator float to follow an axial path through the tube. This invention pertains particularly to a tube fitted with such guides.

These guides are here shown as separable from the tube. They constitute an assembly carried by but removable from the tube. The guides are here shown as guide wires 60 secured at the top to a ring 62 which ring rests upon the upper end of the glass tube 20. This ring is shaped to so fit upon the tube, having a portion 63 receivable within the tube, as to position the guides carried by the ring with respect to the tube. The upper ends of the wires 60 are bent over as at 61 and secured within apertures in the ring 62.

At the bottom these wires 60 extend freely through apertures in a ring 64 which ring rests against the lower end of the glass tube 20. Gaskets 65 are interposed between the rings 62 and 64 and the adjacent ends of the glass tube. The ring 64 is provided with an axial portion 67 receivable within the lower end of the tube to position the ring 64 and the wire guides accurately with respect to the tube.

To maintain tension upon the wires 60 springs 66 are shown in Figure 3 of the drawing as encircling the wires between the ring 64 and a rigid ring 68. Nuts 70 are threaded on the ends of the wires. These springs maintain the individual guide wires 60 under uniform tension. Only two guide wires are shown in Figure 3 and the ring 68 can tilt if the spring tension on one wire sufficiently exceeds the spring tension on the other wire.

In Figure 7 four guide wires 60 are shown. These are all secured at the top as at 61 to the ring 62 as described in connection with the structure of Figure 3. At the bottom these wires extend slidably through the ring 64 and through ferrules 67 secured in the ring 68. Nuts 70 are threaded on to the guide wires. The ring is flexible so as to permit adjustment of tension as between the several wires as imposed by the springs 66.

A float element is slidably disposed between the wires 60 to be guided by the wires in its up and down movement. This float element is illustrated as comprising a stem portion upon which is mounted a plurality of radially projecting discs 74. Spacer elements 72 are interposed between the discs and supported upon the stem portion 71. The stem 71 extends through the discs 74 and spacer portions 72 and holds the float assembly together.

Three such discs are shown in Figure 3. These discs slidably contact the wires 60 and the float is guided by such slidable contact to follow an axial path in its up and down movement through the tube. The cross sectional area of the liquid passageway between the outer edges of the discs and the inner surface of the tapered wall portion of the tube varies vertically in cross sectional area as will be apparent from the drawing.

In Figures 3 through 6 only two guide wires 60 are shown. These are arranged at opposite ends of a diameter. These wires extend through the bottom ring 64 as shown in Figure 3 so that such ring provides a stop for the downward movement of the float. The wires however extend through the opening in the top ring 62 and are bent outwardly and downwardly as shown at 61 into said ring. Due to this construction it is possible to withdraw the indicator float upwardly through the top ring or to insert the float downwardly therethrough.

A stop element is shown in the drawings to prevent the float rising beyond the top of the tube under the influence of the liquid flow. This stop element is here shown as consisting of a pin 80 secured to and depending below the cap 30 axially of the flow meter tube. Depending from the lower end of this pin 80 is a conical coil spring 80-a which has a diameter at its lower end of a size to engage the top of the float as it rises thereagainst. When the cover plate 30 is removed this stop assembly comes off with the cover plate so that the float is readily accessible for removal. The spring 80-a depends into the end of the tube sufficiently below the ring 62 so that the float is stopped such a distance below the ring that the space between the upper disc of the float and the ring is not less than the annular fluid passageway between the float discs and the wall of the tube whereby flow of fluid will be free between the float and the ring.

In this two-wire guide construction the discs of the float are notched as shown particularly in Figures 3 and 5. In Figure 5 these notches are indicated as 77. They are of a size to receive the wires so that the float is held in place between the wires against displacement, tilting or rotation.

In Figures 7 through 10, four guide wires 60 are shown. The discs of the float supported between these four wires are not notched. The wires engage the peripheries of the discs and the float can rotate. The float here shown has its discs 74 held together by a plurality of pins 79 extending through the discs and through spacers 78 mounted upon the pins between the discs as shown in my co-pending application Serial No. 676,250, filed June 12, 1946.

In Figure 3 the discs are shown as beveled to an edge as compared with the discs shown in the other figures of the drawing. The pin 71 (Figure 3) extends above the top disc to be grasped to permit lifting the float out of the tube. In Figure 7 there is a pin 71-a which extends above the top disc for the same purpose.

What I claim is:

1. In a flow meter, a flow meter tube having an upright bore portion of vertically varying cross sectional area, guide supports at opposite ends of the tube, a plurality of metering float guides extending between said supports through the bore of the tube parallel to the axis and spaced from the wall of the tube, means exerting longitudinal tension on individual guides, a metering float disposed between said guides for movement axially through the bore,, the guide support at one end of the bore having an opening oversize the float to permit passage of the float therethrough.

2. In a flow meter, a flow meter tube having an upright bore portion of vertically varying cross sectional area, guide supports at opposite ends of the tube, a plurality of guides extending between the supports through said bore portion parallel to its axis and spaced apart circumferentially of the bore, a metering float disposed between said guides for slidable travel thereover axially of the bore, the guide support at one end of the tube having an opening oversize the float to permit passage of the float therethrough.

3. In a flow meter, a flow meter tube having an upright bore portion of vertically varying cross sectional area, annular guide supports at opposite ends of the tube, a plurality of guide wires secured at opposite ends to the supports and extending through the bore portion of the tube parallel to its axis, said guide wires being spaced apart circumferentially of the bore, a metering float disposed between said guide wires for slidable travel thereover axially of the bore, one of said annular supports having an opening the diameter of which exceeds the diameter of the float.

4. In a flow meter, a flow meter tube having an upright bore portion of vertically varying cross sectional area, annular guide supports mounted upon opposite ends of the tube, each guide support having flange means disposed circumferentially about its opening and received within the end of the tube positioning the support with respect to the tube, a plurality of guide wires secured at opposite ends to the supports and extending through the bore of the tube between the supports parallel to the axis of the bore and spaced from the wall of the tube, said guide wires extending through the opening in one guide support and secured thereto outwardly beyond said opening, and a metering float disposed between said guide wires for slidable travel axially of the bore of the tube, said float being slidable through the opening in the guide support through which the wires extend.

5. In a flow meter, an upright flow meter tube having a tapered bore, a float guiding cage comprising a pair of annular guide wire supports seated one upon each end of the tube and a plurality of guide wires extending between said supports and carried thereby, said wires being longitudinally tensioned and extending through the bore of the tube parallel to the axis of the bore and spaced from the wall of the tube, a float slidably supported within the cage between the annular supports for travel vertically of the bore as guided by said wires, and one of said annular guide wire supports having an inside diameter greater than the diameter of the float.

6. In a flow meter, an upright flow meter tube having a tapered bore, a float guiding cage comprising a pair of annular guide wire supports seated one upon each end of the tube and a plurality of guide wires extending between said supports and carried thereby, said wires being longitudinally tensioned and extending through the bore of the tube parallel to the axis of the bore and spaced from the wall of the tube, a float slidably supported within the cage between the annular supports for travel vertically of the bore as guided by said wires, and one of said annular guide wire supports having an inside diameter greater than the diameter of the float and the other guide wire support having an inside diameter less than the diameter of the float, the body of the annular guide wire support of less inside diameter having additional openings through which end portions of said guide wires extend, spring means engaging the body of said last mentioned support and connected with the end portions of said guide wires for individually tensioning each of said wires.

7. In a flow meter, a flow meter tube having an upright bore portion of vertically varying cross sectional area, said bore terminating in an inlet at one end and an outlet at the opposite end, a plurality of guide wires extending through said bore parallel to and spaced from its axis and spaced from the wall of the bore and spaced apart circumferentially of the bore, means supporting said guide wires tensioned taut through the bore, and a metering float disposed between the guide wires for travel axially through the bore, said float having such a diameter between the wires that it maintains slidable contact therewith and is held thereby to travel axially through the bore.

8. In a flow meter, a flow meter tube having an upright bore portion of vertically varying cross sectional area, said bore provided with a liquid inlet at one end and a liquid outlet at the opposite end, a pair of guide wires extending through said bore parallel to and spaced radially from its axis at opposite ends of a diameter of the bore, means supporting said guide wires tensioned taut through the bore, a metering float disposed between said wires and provided with notches seating over the wires and conforming in shape therewith, said float having such a diameter between said notches that it maintains slidable contact with the wires and is guided thereby to travel axially through the bore.

CLAUDE E. COX.

REFERENCES CITED

The following references are of record in the file of this patent:

UNITED STATES PATENTS

| Number | Name | Date |
| --- | --- | --- |
| 1,396,565 | Fell | Nov. 8, 1921 |
| 2,313,889 | Porter | Mar. 16, 1943 |
| 2,437,247 | Fischer | Mar. 9, 1948 |

OTHER REFERENCES

A publication, Special Testing Instruments Bulletin No. 412-0538, published May 1938 by Commercial Engineering Laboratories, 4612 Woodward Ave., Detroit, Michigan, and showing the Type VI Direct Reading Air Flow Indicator.